United States Patent [19]

Kennon

[11] Patent Number: 4,644,321

[45] Date of Patent: Feb. 17, 1987

[54] WIRELESS POWER LINE COMMUNICATION APPARATUS

[75] Inventor: Jerry M. Kennon, Raleigh, N.C.

[73] Assignee: Westinghouse Electric Corp., Pittsburgh, Pa.

[21] Appl. No.: 663,252

[22] Filed: Oct. 22, 1984

[51] Int. Cl.⁴ .................. H04M 11/04; G08B 23/00
[52] U.S. Cl. ..................... 340/310 A; 340/870.02
[58] Field of Search ........ 340/310 A, 310 R, 310 CP, 340/696, 870.02

[56] References Cited

U.S. PATENT DOCUMENTS

| | | | |
|---|---|---|---|
| 4,101,878 | 7/1978 | Shimizu | 340/310 A |
| 4,360,801 | 11/1982 | Duhame | 340/696 |
| 4,430,639 | 2/1984 | Bennett | 340/310 A |
| 4,463,354 | 7/1984 | Sears | 340/870.02 |
| 4,481,501 | 11/1984 | Perkins | 340/310 R |
| 4,499,464 | 2/1985 | Knox et al. | 340/696 |
| 4,504,705 | 3/1985 | Pilloud | 340/310 R |
| 4,514,594 | 4/1985 | Brown et al. | 340/310 R |

Primary Examiner—Douglas W. Olms
Assistant Examiner—Curtis Kuntz
Attorney, Agent, or Firm—B. R. Studebaker

[57] ABSTRACT

A field configuration terminal is provided that does not require physical or electrical connection to a remote device of a power line communication system. A toroid is provided that comprises a multiplicity of turns of a conductor that is connected in electrical communication with an amplifier and receiver circuitry within the field configuration terminal. A battery, with associated power supply components, provides a direct current source for the microprocessor and logic of the field configuration terminal and for the amplifier thereof. The toroid of the field configuration terminal is shaped to be disposed around a load management terminal of a power line communication system without physical or electrical contact therewith. Signals are transmitted to and received from the load management terminal by inductively coupling the toroid with the load management terminal in signal communication.

6 Claims, 6 Drawing Figures

WIRELESS POWER LINE COMMUNICATION APPARATUS

BACKGROUND AND SUMMARY OF THE INVENTION

The present invention relates generally to power line communication systems and, more particularly, to a wireless field configuration terminal for communicating with a power line communication device without the requirement of direct physical or electrical connection thereto.

Power line communication systems have been developed for the purposes of permitting a central communication station to transmit and receive messages from remote devices. In the typical application, such as an electric utility system, a multiplicity of consumers is provided with power line communications devices that enable a central station of the electric utility to transmit messages to each of the consumers devices and receive messages therefrom. In a typical application, the central station would transmit load shed commands or requests for energy consumption data from the remote terminals and receive transmissions from the remote terminals relating to the electrical energy consumption of the associated residence or acknowledgement that a load shed command has been executed. The remote power line communication devices located at the consumer's residence can be an electrical energy meter or a load management terminal. Although some load management terminals are provided only with the ability to receive messages, many applications employ load management terminals and electrical meters that have the capability of two-way communication with the central station.

U.S. Pat. No. 3,911,415, which issued on Oct. 7, 1975 to Whyte, discloses a distribution network power line carrier communication system for linking individual power consumers with a central station, including the power distribution network between a distribution substation and the customer locations. U.S. Pat. No. 3,967,264, which issued on June 29, 1976 to Whyte et al, discloses a distribution network power line communication system which is divided into addressable communication zones defined by repeaters that are located at the distribution transformers of the distribution network. U.S. Pat. No. 3,942,170, which issued on Mar. 2, 1976 to Whyte, discloses a distribution power line carrier communication system for providing automated distribution functions. U.S. Pat. Nos. 3,911,415, 3,967,264 and 3,942,170 are hereby incorporated by reference.

U.S. Pat. No. 4,302,750, which issued on Nov. 24, 1981 to Wadhwani et al, discloses a data communications system for conveying load control commands, power usage data and other data on electrical power lines. It utilizes a remote module for reading the power usage meters and controlling loads. U.S. Pat. No. 4,382,248, which issued on May 3, 1983 to Pai, discloses a remote device for receiving communication signals carried by the phase conductors of a multi-phase power distribution network communication system. The device includes a circuit for independently receiving each of the communication signals carried by the phase conductors. U.S. Pat. Nos. 4,302,750 and 4,382,248 are hereby incorporated by reference.

The signals that are transmitted on the power lines in a power line communication system can be modulated by a number of techniques. One particularly useful technique is a phase-keyed modulation system that utilizes a carrier signal which is modulated with a baseband data message comprising digital data. In a typical application, the carrier signal has a frequency of approximately 12.5 kilohertz, and this carrier signal is modulated with the baseband data message. The phase shift-keyed modulation can be accomplished by utilizing an exclusive-OR device having the carrier signal and the baseband data message as its inputs. The modulated signal is then amplified and then injected onto the power line.

U.S. Pat. No. 4,323,882, which issued on Apr. 6, 1982 to Gajjar, discloses a method and apparatus for inserting carrier frequency signal information onto distribution transformer primary windings. Using this apparatus, power line carrier frequency signals are provided at a distribution transformer primary winding by controlled current injection onto the neutral and phase conductors of the distribution transformer secondary winding circuit. When the modulated signal is received by either a remote device or the central station, it must be demodulated before the transmitted message can be decoded. U.S. Pat. No. 4,311,964, which issued on Jan. 19, 1982 to Boykin discloses an apparatus and method for demodulating phase shift-keyed messages. It includes sequentially processing plus and minus polarity samples of plural carrier segments occurring within each carrier data symbol. U.S. Pat. Nos. 4,323,882 and 4,311,964 are hereby incorporated by reference.

As discussed above, the remote devices of a power line communication system can be either load management terminals or electrical meters. U.S. Pat. No. 4,130,874, which issued on Dec. 19, 1978 to Pai, discloses a load management terminal having plural selectable address formats for a power line communication system. U.S. Pat. No. 4,130,874, issued on Dec. 19, 1978 to Pai, discloses a load management terminal that is addressable by alternate codes. U.S. Pat. No. 4,402,059, which issued on Aug. 30, 1983 to Kennon et al, discloses a load management terminal that is utilized as an end device in a utility's distribution network communication system. It comprises a power line coupling unit for connecting the load management terminal to the power distribution network. It also comprises a signal receiver and conditioning unit that produces a command signal in response to a receive communication signal from the power line communication system. U.S. Pat. No. 4,429,366, which issued on Jan. 31, 1984 to Kennon, discloses a microprocessor-based load management terminal with reset capabilities. A microprocessor performs load control functions in response to command signals that are produced by a signal receiver and conditioning unit.

Many other types of apparatus and methods are known to those skilled in the art of power line communication systems. For example, U.S. Pat. No. 4,379,284, which issued on Apr. 5, 1983 to Boykin, discloses a coherent phase shift keyed demodulator for power line communication systems, U.S. Pat. No. 4,355,303, which issued on Oct. 19, 1982 to Phillips et al, discloses a receiver for distribution network power line carrier communication systems, U.S. Pat. No. 4,250, 489, which issued on Feb. 10, 1981, to Dudash et al, discloses a distribution network communication system having branch connected repeaters and U.S. Pat. No. 3,925,728, which issued on Dec. 9, 1975 to Whyte, discloses an induction watthour meter for power systems transmitting carrier communication signals.

Occasionally, it becomes necessary for an electric utility to examine the operation of a particular remote device or alter the operational data contained therein. In a typical application, this requires an operator to travel to the residence with which the device is associated and perform various procedures in order to determine if the device is operating properly or, alternatively, to change the operational instructions or data contained within the device. This second procedure would generally relate to the alteration of messages or data stored in a microprocessor within the remote device.

U.S. Pat. No. 4,467,314, which issued on Aug. 21, 1984 to Weikel et al, discloses a field configuration terminal (FCT) that provides a means for efficiently testing and assigning addresses to load management terminals in the field. It describes a combination field configuration and test terminal which can be plugged into a load management terminal in the field. The combination terminal is coupled to the power line through the connection to the load management terminal and generates a separate set of test commands for each type of load management terminal. These test commands are transmitted over the power line for execution by the connected load management terminal. This set of test commands comprises commands that instruct the load management terminal to accept and store an address value received over the power line as its new unique address. Other types of commands and instructions can also be transmitted to the load management terminal during these configuration and testing procedures. U.S. Pat. No. 4,467,314 is hereby incorporated by reference.

Field configuration terminals (FCT's) such as the one described in U.S. Pat. No. 4,467,314 are generally designed to be implemented in one of two ways. First, the associated load management terminal (LMT) can be provided with a socket into which a plug of the FCT can be inserted. In one particular application, the plug is provided with 28 pins through which the FCT can obtain both power, for its operation, and communications signals. When this methodology is used, the receptacle is generally formed as a part of the load management terminal's base. In customary designs of this type of load management terminal, the receptacle is connected in electrical communication with the power line in such a way as not to consume electrical energy for which the consumer would be charged. A major disadvantage of this type of load management terminal is that the receptacle, or socket, is part of the load management terminal's base. This not only increases the cost of the load management terminal, but also provides a potential safety hazard to the consumer. Furthermore, since the receptacle is accessible, tampering can be difficult to prevent.

Another approach for connecting a field configuration terminal (FCT) to a load management terminal (LMT) includes the use of a conventional electrical receptacle in the resident's house wiring system. A conventional electrical plug can be provided with the field configuration terminal and it can be plugged into the conventional electrical receptacle. This procedure would provide electrical power for the operation of the field configuration terminal and also provide a coupling between the FCT and the power line. The FCT could then inject modulated power line communication signals into the house wiring system for receipt by the load management terminal. This procedure presents two disadvantages. First, it utilizes the electrical energy of the consumer, for which the consumer will be charged. Although a typical application of a field configuration terminal utilizes a very small amount of electrical energy, electric utilities generally prefer to refrain from this approach as a matter of policy. Another disadvantage to this approach is that not all consumer residences have electrical receptacles that are proximate the load management terminal. This fact could make the use of a conventional electrical receptacle at the residence inconvenient.

In view of the above discussion, it should be apparent that a field configuration terminal which does not require physical contact with the load management terminal would provide significant advantages to an electrical utility that employs a power line communication system with a plurality of remote devices.

The present invention provides a field configuration terminal that enables messages to be transmitted to and received from a load management terminal, or electrical meter, without the requirement of physical or electrical contact between the field configuration terminal and the load management terminal. The present invention comprises a multi-turn conductor that is configured in the shape of a toroid. The toroid is shaped to fit around the load management terminal.

The field configuration terminal of the present invention comprises a means for modulating a carrier signal with a baseband message. In a phase shift-keyed modulation system, an exclusive-OR gate can be used to provide this modulation. The exclusive-OR gate has two inputs, one connected to a carrier generator and the other connected to a source of the baseband data message. The carrier generator, in a typical application of the present invention, provides a carrier signal of 12.5 kilohertz and the base-band data message is provided by a microprocessor that formulates the message and sends it to the input of the exclusive-OR gate.

The present invention also comprises an amplifier that has, as its input, the output of the exclusive-OR gate. The output of the amplifier is operatively associated with the conductor that is formed into the shape of a toroid with a multiplicity of turns.

The present invention also comprises receiver circuitry that receives a sinusoidal signal from the toroid, passes the signal through a high pass filter, hard limits the signal and sends the signal to an input of a demodulator. In a preferred embodiment of the present invention, the demodulator is incorporated within a microprocessor.

In some applications, the load management terminal has a magnetically actuated switch that is used by its microprocessor to determine the validity of incoming signals. More particularly, the magnetically actuated switch provides a signal that is indicative of the presence of a field configuration terminal. The actuation of the switch within the load management terminal causes a signal which permits certain procedures to be used to affect the data and instructions within the load management terminal's microprocessor. In order to implement this procedure, the toroid of the present invention can be provided with a magnet attached thereto at an arcuate position coincident with the magnetically actuated switch of the load managment terminal.

The present invention also comprises a battery operated power supply that provides a direct current for the operation of its microprocessor and control logic. This power supply also provides a direct current source for the amplifier.

The present invention provides a portable field configuration terminal that requires no physical or electrical connection with a remote load management terminal. It is capable of transmitting messages to the load management terminal and receiving messages therefrom. Amplified signals passing through the turns of the toroid induce a fluctuating magnetic field that induces current signals in the components, wires and printed circuit board runs of the load management terminal. These induced current signals are received by the load management terminal's microprocessor and processed as if they were transmitted from either a remote transmitter or a field configuration terminal electrically connected to the power line. The toroid of the present invention also receives signals transmitted from the load management terminal. When the load management terminal transmits a message, the resulting magnetic fields induce current signals in the turns of the toroid and these signals are received by the receiver circuitry of the present invention and subsequently demodulated by the demodulator within its microprocessor.

BRIEF DESCRIPTION OF THE DRAWING

The present invention will be more fully understood from a reading of the Description of the Preferred Embodiment in conjunction with the drawing, in which.

DESCRIPTION OF THE PREFERRED EMBODIMENT

Figure 1:
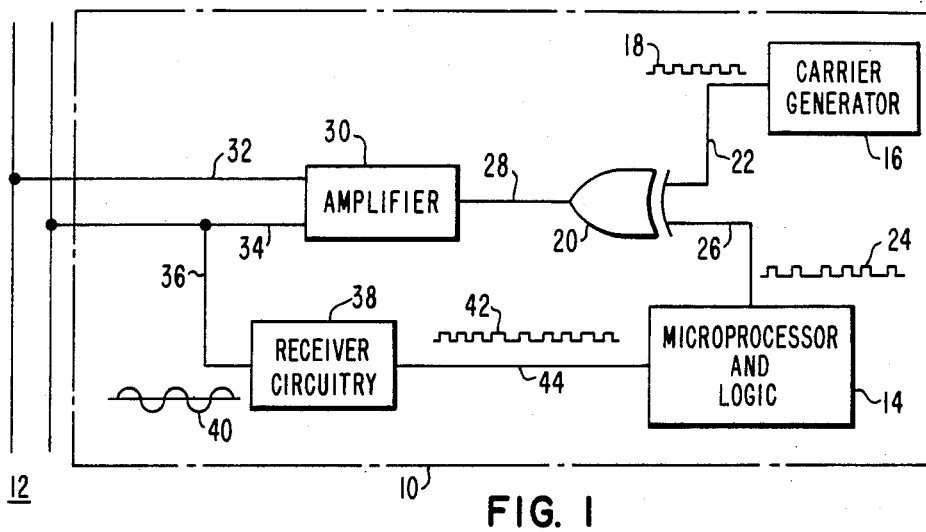
FIG. 1 illustrates a simplified schematic of a load management terminal.

Throughout the description of the preferred embodiment, like reference numerals will be used to illustrate like components.

In FIG. 1, a simplified schematic diagram of a load management terminal is illustrated. The load management terminal 10 is configured to transmit modulated signals to a power line 12 and receive modulated signals therefrom. The load management terminal of FIG. 1 comprises microprocessor and logic 14 that can formulate messages and demodulate incoming messages. The carrier generator 16, in a typical application of a load management terminal, employs a crystal oscillator and provides a 12.5 kilohertz carrier signal 18 as an input to a modulator 20 on line 22. The microprocessor and logic 14 provide a baseband data message 24, on line 26, to the other input of the modulator 20. The modulated signal is sent by the modulator 20, on line 28, to an input of an amplifier 30. The amplifier 30 is electrically connected to the power line 12 by lines 32 and 34. These components are used during the transmission of a message from the load management terminal 10 to the power line 12.

During reception of a message from the power line 12 to the load management terminal 10, the incoming modulated signal is received by receiver circuitry 38, on lines 34 and 36. The receiver circuitry passes the incoming modulated signal 40, which is generally sinusoidal, through a high pass filter and then hard limits the resulting signal to form an incoming message signal 42 which is essentially a square wave. This incoming message signal 42 is sent from the receiver circuitry 38 to the microprocessor and logic 14 on line 44. The microprocessor and logic 14 then demodulate the signal and interpret its command.

The simplified schematic illustrated in FIG. 1 represents a typical load management terminal that is generally known to those skilled in the art. For example, U.S. Pat. No. 4,323,882 discloses a means for providing an amplified driving signal current. U.S. Pat. No. 4,382,248 describes receiver circuitry that is applicable with power line communication systems. U.S. Pat. No. 4,311,964 discloses a phase shift-keyed demodulator that could be incorporated within the microprocessor and related logic 14.

It should be understood that the basic components illustrated in FIG. 1 for a load management terminal are similar to the components used by known field configuration terminals. Since both devices are utilized to receive and transmit messages to other devices in a power line communication system, they utilize and require similar components. For example, in FIG. 2 a known type of field configuration terminal (FCT) is illustrated.

Figure 2:
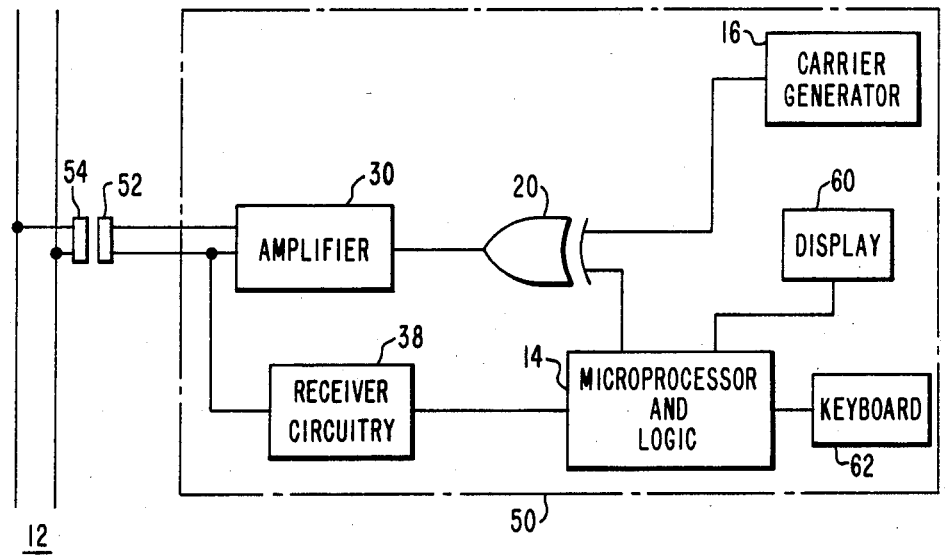
FIG. 2 is a schematic diagram of an exemplary field configuration terminal.

The field configuration terminal 50 illustrated in FIG. 2 comprises a microprocessor and logic 14 that is associated with a modulator 20 and carrier generator 16. The modulated signal is input to an amplifier 30 and the microprocessor and logic 14 is connected in signal communication with receiver circuitry 38.

The field configuration terminal 50 differs from the load management terminal 10 in its method of connection to the power line 12. Known field configuration terminals normally utilize a plug, or connector 52, that has a plurality of pins associated therewith. The plug 52 is shaped to be received in a socket, or receptacle 54, that is connected in electrical communication with the power line 12. By connecting the plug 52 and the receptacle 54, the field configuration terminal 50 can easily be provided with electrical power for its operation and connected in signal communication with the power line 12. This connection permits the amplifier 30 to inject signals onto the power line 12 and permits the receiver circuitry 38 to receive signals from the power line system 12 which were transmitted from some remote device.

The field configuration terminal 50 also differs from the load management terminal 10 by incorporating a display 60 and a keyboard 62 that are connected in signal communication with the microprocessor and logic 14. The purpose of the keyboard 62 is to provide a means for manually entering data that is to be formulated, modulated and transmitted to the power line 12. The purpose of the display 60 is to permit an operator to view data that is stored in the microprocessor and logic 14. This data can represent messages received from a remote device or the contents of memory locations within the microprocessor.

In summary, the field configuration terminal 50 illustrated in FIG. 2 is provided with the required components for transmitting and receiving messages in association with a power line system 12. It is also provided with a means for connecting, both physically and electrically, to the power line system 12. In FIG. 2, this connecting means is illustrated as a plug 52 and a receptacle 54. The keyboard 62 and display 60 permit an operator to easily communicate with the field configuration terminal 50 and a remote device.

Figure 3:
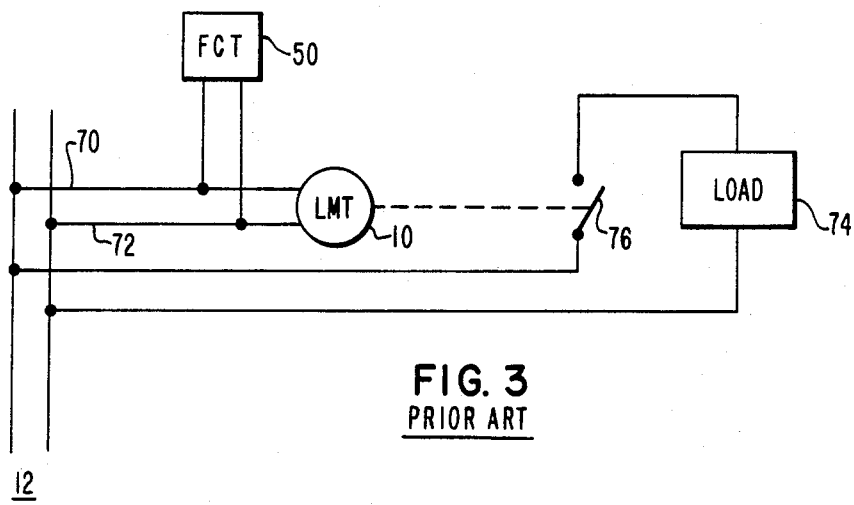
FIG. 3 illustrates an application of a known field configuration terminal in association with a load management terminal.

FIG. 3 illustrates an exemplary association of a field configuration terminal FCT 50 and a load management terminal LMT 10. The load management terminal 10 is connected in electrical communication with the power line system 12 by lines 70 and 72. Also connected to the power line system 12 is a load 74. In a typical application, the load 74 could be an air conditioner, water heater or some other load that is intended to be shed during periods of high demand or at other times as determined by the electric utility. Typically, the load 74 would be connected to the electrical system of the residence by being plugged into a conventional wall receptacle. When a load management terminal 10 is used, the sheddable load 74 is connected in series with a switch 76 that is controlled by the load management terminal 10. When a shed command is received by the load management terminal 10, it opens the switch 76 and sheds the load 74 to reduce overall demand on the electric utility.

When a conventional FCT 50 is used, it is connected to the power line 12 in one of two ways. It can be connected directly to a receptacle that is in electrical communication with the power line 12 or, alternatively, can be plugged into a receptacle that is an integral portion of the base of the LMT 10. Regardless of the particular means for electrically connecting the FCT 50 to the power line 12, it is connected in both electrical and signal communication with the LMT 10 during its operation. Signals are transmitted from the FCT 50 to the LMT 10 and signals are received by the FCT 50 from the LMT 10. The configuration illustrated in FIG. 3 requires a direct physical and electrical connection between the FCT 50 and either the LMT 10 or a receptacle of the power line system 12.

Figure 4:
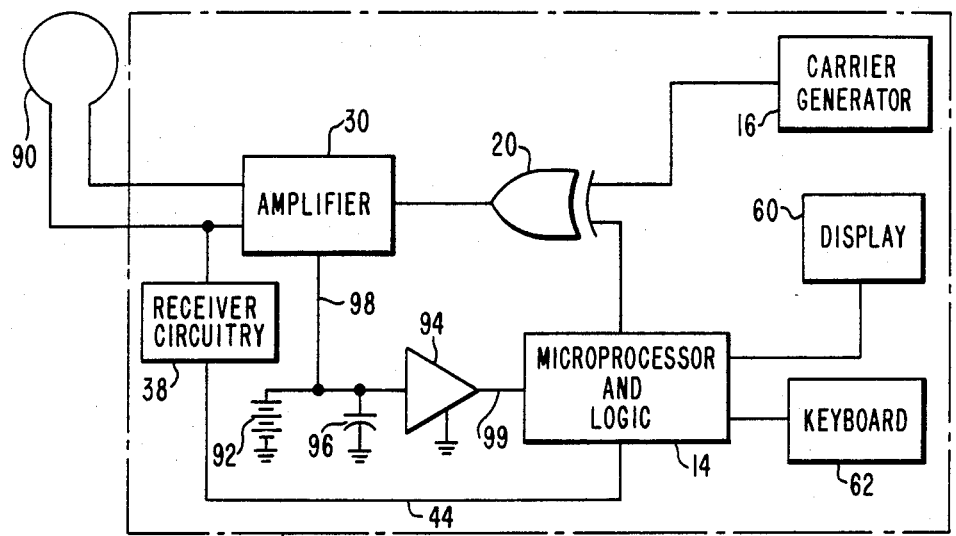
FIG. 4 illustrates a preferred embodiment of the present invention.

FIG. 4 illustrates a field configuration terminal 80 made in accordance with the present invention. The field configuration terminal 80 of the present invention comprises microprocessor and logic 14, a carrier generator 16 and a modulator 20 in an association similar to the field configuration terminal 50 illustrated in FIG. 2 and load management terminal 10 illustrated in FIG. 1. Similarly, the field configuration terminal 80 of the present invention also includes an amplifier 30 which is connected to the output of the modulator 20.

Receiver circuitry 38 is provided by the present invention in order to receive an incoming modulated signal that is generally sinusoidal, pass the signal through a high pass filter, hard limit the signal and send it to the microprocessor and logic 14 on line 44. The construction and implementation of the carrier generator 16, microprocessor and logic 14, modulator 20, amplifier 30 and receiver circuitry 38 are similar to those utilized by both the load management terminal 10 and field configuration terminal 50 that are illustrated in FIGS. 1 and 2, respectively. The field configuration terminal 80 of the present invention, as illustrated in FIG. 4, also comprises a display 60 and keyboard 62 which are functionally similar to those of the field configuration terminal 50 illustrated in FIG. 2. The differences between the field configuration terminal 80 of the present invention and the field configuration terminal 50 known to those skilled in the art relate to the means for communicating its output signals to a load management terminal and receiving input signals therefrom. Another distinction between the present invention and known load management terminals is its means for providing a direct current source for the microprocessor and logic 14 and amplifier 30.

As shown in FIG. 4, the present invention comprises a conductor that is shaped as a toroid 90 and connected in electrical communication with both the amplifier 30 and the receiver circuitry 38. It is connected to these components in much the same way as a power line is connected to the load management terminal 10 which is illustrated in FIG. 1. Although the toroid 90 is illustrated as having a single turn in FIG. 4, it should be understood that a preferred embodiment of the present invention would incorporate a plurality of turns. More specifically, a toroid 90 made in accordance with the present invention comprises 50 turns of No. 22 AWG wire connected in electrical communication with the amplifier 30 and the receiver circuitry 38. The toroid is enclosed in a non-conductive and non-magnetic material, such as a resin. It is shaped in a generally circular configuration because of the fact that typical load management terminals with which the present invention will be associated are generally circular in shape, however, it should be understood that other shapes can be used to accommodate other types of power line communication devices.

The present invention also comprises a means for providing a direct current source for both the microprocessor and logic 14 and amplifier 30. in a preferred embodiment of the present invention, this power supply comprises a battery 92 and a regulator 94. Connected as shown in FIG. 4, along with capacitor 96, this association provides a regulated DC supply for the microprocessor and logic 14 and power for the amplifier 30. In a preferred embodiment of the present invention, the battery 92 is a 12-volt battery that provides 9 to 12 volts DC to the amplifier on line 98 and, in cooperation with the regulator 94, provides 5 volts DC to the microprocessor and logic 14 on line 99. This direct current power source permits the field configuration terminal 80 of the present invention to be totally portable without any requirement that it be physically or electrically connected to any other device. The toroid 90 permits the signals from the amplifier 30 to be inductively coupled to a load management terminal without direct contact therewith and the power supply, including battery 92 and regulator 94, provides power that avoids the necessity of electrical connection to the power line system.

Figure 5:
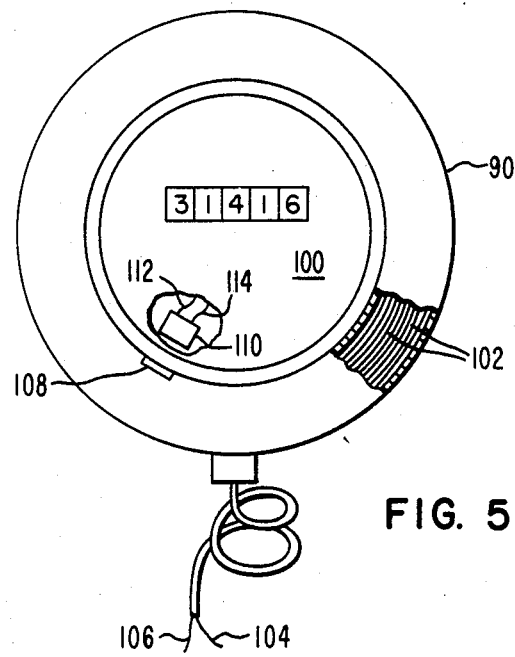
FIG. 5 illustrates the toroid of the present invention disposed around a load management terminal.

FIG. 5 illustrates the toroid 90 of the present invention disposed around an exemplary load management terminal 100 which would comprise the elements illustrated in FIG. 1. The toroid 90 comprises a plurality of turns 102 of a conductor having two ends 104 and 106. The case of the toroid 90 is made of a non-conductive and non-magnetic material, such as phenolic resin or plastic. The conductor from which the multiturn winding is made, in a preferred embodiment of the present invention, is No. 22 AWG wire. A preferred embodiment of the present invention includes 50 turns 102. However, it should be understood that, for different frequencies and applications, a different number of turns and a different size wire could be used.

A magnet 108 is attached to the toroid 90 at a position that is proximate the location of a magnetically actuated switch 110 within the load management terminal 100. The magnetically actuated switch 110 typically is provided with two wires, 112 and 114, which are connected in signal communication with a microprocessor within the load management terminal 100. The magnetically actuated switch, which can be a reed switch, provides a signal that informs the microprocessor that the magnet 108 is properly located. This signal is used to identify the presence of a field configuration terminal around the load management terminal 100. If this signal is present, the load management terminal 100 permits the field configuration terminal to perform certain operations that would otherwise be prohibited. In FIG. 5, the magnet 108 is positioned at approximately 30° from the bottom portion of the load management terminal 100, but it should be understood that alternative positions are contemplated within the scope of the present invention. The location of the magnet 108 is dependent on the relative location of the magnetically operated switch 110 within the load management terminal. As can be seen in FIG. 5, the toroid 90 of the present invention can be disposed around the load management terminal 100 without any direct physical or electrical contact therebetween.

Figure 6:
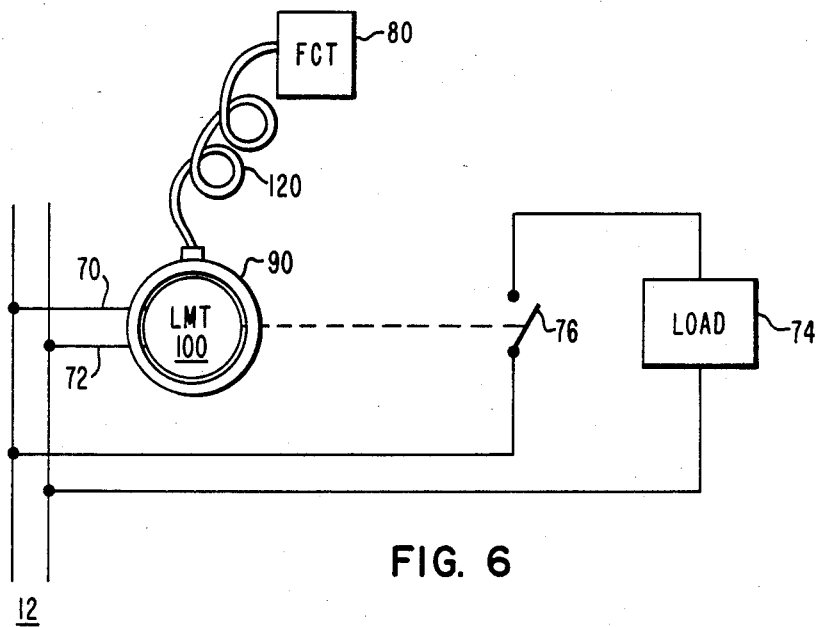
FIG. 6 illustrates the present invention associated with a load management terminal.

FIG. 6 illustrates a field configuration terminal 80 made in accordance with the present invention associated with a load management terminal 100. The toroid 90 of the present invention is disposed around the load management terminal 100 without any physical or electrical connection required therebetween. In FIG. 6, the toroid 90 is shown connected to the field control terminal 80 by a coiled cable 120, but it should be understood that alternative connections between the FCT 80 and the toroid 90 are possible and contemplated within the scope of the present invention.

Comparing FIGS. 3 and 6, the advantages of the present invention can be seen. For example, the present invention does not require direct electrical connection between its field configuration terminal 80 and the load management terminal 100. The field configuration terminal 80 transmits messages to the load management terminal 100 by sending a modulated signal through the conductor within the toroid 90. The passage of this modulated signal through the turns of the conductor within the toroid 90 produces an intermittent magnetic field within the region of the load management terminal 100. This magnetic field induces currents to flow within the conductive portions of the load management terminal. These conductive portions comprise wires, components and leads inside the load management terminal 100. These induced currents represent the modulated signal transmitted by the field configuration terminal 80. The current travelling through the conductive components of the load management terminal 100 are received by its microprocessor as if they were transmitted from a remote device in electrical communication with the power line system 12. Similarly, when the load management terminal 100 transmits a modulated message, magnetic fields are produced and these magnetic fields induce currents to flow in the conductor within the toroid 90. These currents represent modulated messages and, since the conductor within the toroid 90 is connected in electrical communication with the receiver 38 of the field configuration terminal 80, the incoming message can be received, hard limited and demodulated as if it was received from the power line system 12 itself.

The present invention has been described with considerable detail and in terms of a preferred embodiment, however, it should be understood that the present invention should not be considered to be so limited and alternative embodiments are within its scope.

What I claim is:

1. Power line carrier communications apparatus, comprising:
    means for modulating a first carrier signal with a baseband message;
    means for amplifying said first modulated carrier signal, said amplifying means having an input connected to an output of said modulating means;
    means for inductively coupling said first modulated carrier signal to a power line communications device having a receiver;
    said coupling means being configured to induce said first modulated carrier signal within conductive components of said power line communications device when said coupling means is disposed proximate said power line communications device and said first modulated signal is amplified by said amplifying means even when said coupling means is physically and electrically disconnected from said conductive components, said coupling means being removably locatable proximate said power line communications device; and
    said amplifying means being electrically connected to said coupling means and configured to transmit said first modulated carrier signal to said coupling means.

2. The apparatus of claim 1, wherein:
    said coupling means comprises a conductor having a multiplicity of turns.

3. The apparatus of claim 1, further comprising:
    means for receiving a second modulated carrier signal;
    means for demodulating said second modulated carrier signal, said demodulating means being operatively associated with said receiving means; and
    said receiving means being electrically connected to said coupling means.

4. The apparatus of claim 1, further comprising:
    display means for representing digital message information relating to said first modulated carrier signal, said display means being operatively associated with said demodulating means.

5. The apparatus of claim 1, further comprising:
    means for manually entering a message into said apparatus, said entering means being operatively associated with said modulating means.

6. The apparatus of claim 5, wherein:
    said entering means comprises a keyboard.

* * * * *